United States Patent [19]
Fox

[11] Patent Number: 6,132,791
[45] Date of Patent: Oct. 17, 2000

[54] NATURAL RED SUNFLOWER ANTHOCYANIN COLORANT WITH NATURALLY STABILIZED COLOR QUALITIES, AND THE PROCESS OF MAKING

[75] Inventor: Gregory J. Fox, Fargo, N. Dak.

[73] Assignee: Barkley Seed, Inc., Yuma, Ariz.

[21] Appl. No.: 09/263,628

[22] Filed: Mar. 5, 1999

Related U.S. Application Data

[60] Provisional application No. 60/077,013, Mar. 6, 1998.

[51] Int. Cl.[7] .................................................. A23L 1/272
[52] U.S. Cl. ............................. 426/540; 426/250; 8/438; 8/646
[58] Field of Search .................................. 426/540, 250; 8/438, 436, 646

[56] References Cited

U.S. PATENT DOCUMENTS

| | | | |
|---|---|---|---|
| 3,963,700 | 6/1976 | Philip | 260/236.5 |
| 4,083,779 | 4/1978 | Combe et al. | 426/495 |
| 4,156,077 | 5/1979 | Pifferi et al. | 536/4 |
| 4,172,902 | 10/1979 | Asen et al. | 426/250 |
| 4,285,982 | 8/1981 | Iacobucci et al. | 426/250 |
| 4,302,200 | 11/1981 | Yokoyama et al. | 8/438 |
| 4,320,009 | 3/1982 | Hilton et al. | 210/651 |
| 4,383,833 | 5/1983 | Hoffmann | 8/438 |
| 4,452,822 | 6/1984 | Shikhande | 426/49 |
| 4,481,226 | 11/1984 | Crosby et al. | 426/540 |
| 5,042,989 | 8/1991 | Eck | 8/438 |
| 5,704,950 | 1/1998 | Putatunda | 8/438 |
| 5,908,650 | 6/1999 | Lenoble et al. | 426/262 |

OTHER PUBLICATIONS

L. Gao and G. Mazza, "Extraction of Anthocyanin Pigments from Purple Sunflower Hulls," Journal of Food Science, 1996, 61(3): pp. 600–603.

G. Mazza and E. Miniati, "XV. Sunflower," Anthocyanins in Fruits, Vegetables and Grains, 1996, pp. 312–313.

G.J. Fox, E.T. Holm and C.E. Fastnaught, "Anthocyanin Quantity, Quality and Stability in a Purple Hulled Hybrid Derived From Neagra De Cluj," Proceedings Sunflower Resaerch Workshop, Jan. 9 & 10, 1989, pp. 17–18.

G.J. Fox, L. Linz and M.L. Dreher, "Survey of Anthocyanin Content of Purple Hulled Sunflower Entries Within the USDA World Collection of Sunflower," Proc. sunflower Research Workshop, Dec. 10, 1968, p. 5.

Gregory J. Fox and Mark L. Dreher, "Extraction of Anthocyanins From Sunflower Hulls," North Dakota Farm Research, 1982, 40(1): pp. 3–6.

A. H. Woo, J.H. von Elbe and C.H. Amundson, "Anthocyanin Recovery From Cranberry Pulp Wastes by Membrane Technology," Journal of Food Science, 1980, vol. 45: pp. 875–879.

R.P. .Metivier, F.J. Francis and F.M. Clydesdale, "Solvent Extraction of Anthocyanins from Wine Pomace," Journal of Food Science, 1980, vol. 45: 1099–1100.

Moise Riboh, "Natural Colors: What Works . . . What Doesn't," Food Engineering, May, 1977, pp. 66–72.

Tibor Fuleki and F.J. Francis, "Quantitative Methods for Anthocyanins. 1. Extraction and Determination of Total Anthocyanin in Cranberries," Journal of Food Science, 1968, vol. 33: pp. 72–77.

Markakis, P., "Anthocyanins and their Stability in Foods." Mar., 1974; pp. 437–456. *CRC Critical Review in Food Technology.*

*Primary Examiner*—Cynthia L. Nessler
*Attorney, Agent, or Firm*—Rothwell, Figg, Ernst & Manbeck

[57] ABSTRACT

The production and use of a stable ruby red natural colorant prepared from an anthocyanin derived from purple hulled sunflower is described. The production of the ruby red natural colorant comprises the extraction of anthocyanin with an organically acidified aqueous solution and separating the extract from residual material. The extract can be concentrated to produce a ruby red concentrate. The natural colorant produced is stable over a wide pH range and upon exposure to light and elevated temperatures. The natural colorant is useful as a coloring agent for food products, cosmetics, pharmaceuticals and other materials.

8 Claims, No Drawings

NATURAL RED SUNFLOWER ANTHOCYANIN COLORANT WITH NATURALLY STABILIZED COLOR QUALITIES, AND THE PROCESS OF MAKING

CROSS REFERENCE

This application is related to U.S. provisional patent application Serial No. 60/077,013 filed Mar. 6, 1998, incorporated herein by reference.

BACKGROUND OF THE INVENTION

The present invention relates to a stable, ruby red natural colorant, and more particularly, to colorant derived from purple sunflower hulls. The stable, red natural colorant is useful as a coloring agent in food products, cosmetics, pharmaceuticals and other materials. The invention further relates to a method of making such red colorant.

The publications and other materials, used herein to illuminate the background of the invention or provide additional details respecting the practice, are each hereby incorporated by reference, and for convenience the full citations are respectively listed, as follows: Fox, G. J. and Dreher, M. L. 1982. "Extraction of anthocyanins from sunflower hulls". *North Dakota Farm Research* 40(1):3–6; Fox, G. J. et al. 1986. "Survey of anthocyanin content of purple hulled sunflower entries within the USDA World Collection of sunflower". *In Proc. Sunflower Research Workshop* Dec. 10, 1986. p. 5; Fox, G. J. et al. 1989. "Anthocyanin quantity, quality and stability in a purple hulled hybrid derived from Neagra de Cluj". *In Proc, Sunflower Research Workshop* Jan. 9 & 10, 1989. pp. 17–18; Fuleki, T. and Francis, F. J., 1968. "Quantitation methods for anthocyanins". *J. Food Sci.* 33:72–78; Gao, L. and Mazza, G. 1996. "Extraction of anthocyanin pigments from purple sunflower hulls". *J. Food Sci.* 61(3):600–603; Mazza, G. and Miniati, E. 1996. "Anthocyanins in Fruits, Vegetables and Grains" *CRC Press*, Ann Arbor, Mich. pp. 312–313: Metivier, R. L., et al., 1980. "Solvent extraction of anthocyanins from wine pomace". *J. Food Sci.* 45:1099–1100; Mok, C. and Hettiarachchy, N. S., 1991. "Heat stability of sunflower hull anthocyanin pigment". *J. Food Sci.* 56:553; Riboh, M., 1977. "Natural colors: what works . . . what doesn't". *Food Engr.*, May:66–72; Woo, A. H., et al., 1980. "Anthocyanin recovery from cranberry pulp wastes by membrane technology". *J. Food Sci.* 45:875–879: and U.S. Pat. No. 4,172,902.

There has been much interest in use of natural colorants, for example in food products, in part due to the delisting by the U.S. Food and Drug Administration of the certified dyes, red dye #2 and red dye #4. Compared to certified dyes, some of the natural colorants are less useful because they are not as temperature and light stable as desired. One such natural colorant which has been used in food products is anthocyanin, the primary natural colorant of fruits. Grape, cranberry and red cabbage extracts are commonly used as anthocyanin based food colorants. Anthocyanins derived from grape skins have been used to fortify the coloration of wines and other food products, but the pigment yield is relatively low (Metivier, et al., 1980). Cranberry extracts are a useful source of anthocyanin, however yield is very low (Woo, et al., 1980). Furthermore, these sources of anthocyanin are expensive to obtain and often unstable, loosing color upon exposure to light, temperatures above 26° C., and at pH levels above 3.0.

Purple hulled sunflower, in which red anthocyanins are concentrated in the hull, are a relatively inexpensive potential source of red anthocyanin. According to Mok and Hettiarachchy (1991), minimum degradation and maximum extraction of anthocyanins from sunflower hulls should be carried out at room temperature using aqueous $SO_2$ solution at a concentration of 1000 ppm. It is well known that sunflower anthocyanins are a brightly colored ruby red when in solution at a pH below 3. However, they quickly lose (red) color and stability as pH is raised with complete color loss as pH is raised above pH 7. It has also been previously reported that sunflower anthocyanins lose color in the presence of light or heat (above 26° C.) (Mazza and Miniati, 1996). Fox and Dreher (1982) have reported that anthocyanin production in sunflower hulls is controlled by two major dominant genes; one directs anthocyanin production in the sunflower plant and the other directs the translocation of anthocyanin into the hull tissue. Fox, et al. (1986) have reported that additional genetic and environmental factors can result in anthocyanin hull percentages ranging from 0.1% to 3.0%.

Certain organic compounds have been shown to stabilize anthocyanins through acylation of the anthocyanin molecule. One such example is "Heavenly Blue" Morning Glory, peonidin 3-(dicaffeylsophoroside)-5-glucoside, which is a naturally occurring anthocyanin acylated with caffeic acid (Asea, et al., U.S. Pat. No. 4,172,902). Limited acylation of sunflower anthocyanins has been reported, with chlorogenic acid being the primary acylating agent (Fox, et al., 1989).

There have been no reports, to date, of sunflower anthocyanin extraction techniques which provide anthocyanin stability over a wide range of pH and exposure to light. Neither has there been any reports of extraction techniques which employ elevated temperatures or result in a colorant which is stable at an elevated pH.

BRIEF SUMMARY OF THE INVENTION

An object of this invention is to provide a stable, ruby red natural colorant derived from purple sunflower hulls. Another object is to provide a ruby red colorant that is stable in the pH range of about 1.0 to about 6.0. A further object of this invention is to provide a ruby red colorant which undergoes no noticeable color loss after exposure to temperatures up to 100° C. Still another object is to provide a ruby red colorant which is stable after prolonged exposure to direct sunlight. Another object is to provide a stable, red natural colorant which is useful as a coloring agent for food products, pharmaceuticals, cosmetics and for coloring grain, textiles, paper and leather. A still further object of this invention is a method of making such a stable ruby red natural colorant.

According to the present invention, the foregoing and other objects are attained by heating hulls from a purple hulled sunflower in an aqueous solution, the pH of which has been adjusted to about pH 2.0 to about pH 6.0 by use of a carboxylic acid, at temperatures up to 100° C., for from about 5 seconds to about 40 minutes. It has been found that the resultant red juice/colorant is heat and light stable and can be used as a stable colorant producing a ruby red natural color over the pH range of about 1.0 to about 6.0. It has been further found that the hulls can be used without being ground and that hulls can be used after removal of the seed or with the seed included and that hulls from sterile, non-seed producing plants can be used.

DETAILED DESCRIPTION OF THE INVENTION

The present invention is directed to a stable red natural colorant derived from purple sunflower hulls. In accordance with the present invention, the ruby red colorant is stable over the pH range of about 1.0 to about 6.0, is stable upon exposure to temperatures up to 100° C., and is stable after prolonged exposure to light. The stable, ruby red colorant of the present invention is useful as a coloring agent for food products, pharmaceuticals, cosmetics and other materials. The present invention is also directed to a method of making such a ruby red colorant.

The colorant extract of the present invention is prepared by selecting purple sunflower hulls containing anthocyanin for processing. While the method of the present invention can be applied with the same results to purple sunflower hulls containing any percentage of anthocyanin by adjusting the duration, treatment temperature and/or pH of the extractant solution, most preferable are hulls with an anthocyanin concentration of at least 0.75% (wt/wt). Assays for percent anthocyanin in hulls can be performed as described by Fuleki and Francis (1968). An acidified aqueous solution of one or more carboxylic acids, including but not limited to: citric acid, tartaric acid, malic acid, and lactic acid is prepared by the addition of the concentrated carboxylic acid to water. Preferably used are those carboxylic acids that are commonly used in food products. Most preferably citric acid is used. The pH of the extractant solution is adjusted and held at a value from about pH 2.0 to about pH 6.0. Preferably pH 2 to 3. Most preferably pH 2.5. The aqueous carboxylic acid extractant solution is then heated and held at or about 55° C. to about 100° C. Preferably the solution is heated to boiling or about 95° C. to 100° C. The hulls are added to the heated solvent in a ratio of from up to 1 part hulls to about 200 parts solvent (wt/wt) through up to 1 part hulls to about 5 parts solvent (wt/wt). Preferably 1 part hulls to 50 parts solvent is used. The hulls are held in the solvent with constant stirring, while holding the temperature and pH constant, for a period of time ranging from 5 seconds to 10 minutes. Preferably, for example when hulls containing about 0.75% anthocyanin are used, the hulls are held for 90 seconds. Upon completion of heating, the solution is removed from the heat source and allowed to cool until the hull/solvent mixture reached 26° C. and the hulls are removed. Preferably the hulls are removed from the mixture within 30 minutes of the mixture reaching 26° C. The resultant colorant extract is a clear, ruby red anthocyanin colorant that maintains its color in sunlight and at temperatures up to 100° C. The pH of the resultant colorant extract can be adjusted to from about pH 1 to about pH 6 without loss of color.

The ruby red anthocyanin colorant extract can be further concentrated by evaporation at temperatures below 100° C. to yield a more concentrated liquid or dry (5% to 10% moisture) ruby red anthocyanin colorant extract concentrate with no resultant loss of color stability.

The extraction and concentration processes above can be applied with similar results to purple hulls from a diversity of sources such as the hulls (only) from purple hulled achenes, including hulls from sterile (non seed producing) purple hulled sunflower plants and whole purple hulled achenes (hull and seed). The hulls may be ground or used whole. Similar results can be obtained with hulls from different lines of purple hulled sunflower, for example Neagra de Cluj, Nabhan and PHH-3.

When the extraction process is performed at holding temperatures below 95° C. the duration of time held at the selected temperature can be adjusted to obtain similar results. For example:

a. If the solvent temperature is reduced to from 85° C. to 94° C., the holding time can be increased to from 60 seconds to 15 minutes.

b. If the solvent temperature is reduced to from 75° C. to 84° C., the holding time can be increased to from 2 minutes to 20 minutes.

c. If the solvent temperature is reduced to from 65° C. to 74° C., the holding temperature can be increased to from 3 minutes to 30 minutes.

d. If the solvent temperature is reduced to from 55° C. to 65° C., the holding temperature can be increased to from 4 minutes to 40 minutes.

Naturally occurring anthocyanins are highly colored at pH's below 3. However, as the pH is raised above 3, and upon exposure to light and heat (temperatures above 26° C.), anthocyanins begin to lose color; converting to colorless carbon bases. The same has been reported for sunflower anthocyanins derived from purple hulled sunflower (Gao and Mazza, 1996). Thus it was most surprising to find that when extracted with organically acidified aqueous solution at elevated temperatures, whole purple hulls yielded a highly stable ruby red anthocyanin colorant over a wide pH range and under various conditions.

The stabilized anthocyanin concentrate described herein unexpectedly has a unique fruity berry aroma that is similar to the aroma of grape berries which is stronger at higher concentrations. If the colorant of the present invention is extracted from a fruit with water and carboxylic acids that are common in fruits (tartaric acid, citric acid, malic acid), the stabilized anthocyanin colorant described herein would be considered a fruit juice under U.S. Food and Drug Administration guidelines. As a result, this product could be used as a colorant food additive for beverages and semisolid (gel like) foods, and as an ingredient in fruit type products such as juices, jellies and jams, yogurts, wines, and other such products.

While the invention has been disclosed in this patent application by reference to the details of preferred embodiments of the invention, it is to be understood that the disclosure is intended in an illustrative rather than in a limiting sense, as it is contemplated that modifications will readily occur to those skilled in the art, within the spirit of the invention and the scope of the appended claims.

DEFINITIONS

The present invention employs the following definitions:

The term "Colorant Extract" as used herein refers to the sunflower hull extract prepared by the process of the invention, including anthocyanin pigment.

The term "Stability" and "Stable" as used herein refers to the ability of an anthocyanin colorant to maintain a stable color (ruby red) across a pH range of about 1.0 to about 6.0, at temperatures of up to 100° C., for a duration of up to 10 minutes, and in direct sunlight for 12 hours of sunlight per day for a duration of 30 days when in aqueous solution.

EXAMPLES

The present invention is further detailed in the following Examples which are offered by way of illustration and are not intended to restrict the scope of this invention in any manner. Standard techniques well known in the art or the techniques specifically described below are utilized.

Example 1

Extraction Percentage and Stability of Anthocyanin

Anthocyanins were extracted from 10 whole purple sunflower hulls (approximately 450 mg) having an anthocyanin concentration of 1.8% in 90 ml of boiling water acidified with citric acid with constant stirring at one of five different pH levels and for the times indicated in Table 1. The extraction percentages and color of the extractant are listed in Table 1.

TABLE 1

| pH | Boiling Time | Extraction Percentage* | Color** Day 1 | Day 30 |
|---|---|---|---|---|
| 2.0 | 30 Sec | 99% | ruby red | ruby red |
| 3.0 | 45 Sec | 95% | ruby red | ruby red |
| 4.0 | 60 Sec | 92% | ruby red | ruby red |
| 5.0 | 70 Sec | 88% | ruby red | ruby red |
| 6.0 | 80 Sec | 80% | ruby red | ruby red |

*Comparison of weight of anthocyanin extracted by method of invention/ weight of anthocyanin extracted in acidified ethanol.
**Color descriptions of the extracts were taken from Riboh (1977).

After treatment with the boiling acidified water, the hulls and solvent were allowed to cool until the solvent temperature reached about 26° C. The hulls were removed, leaving a clear anthocyanin solution requiring no further filtration. The color of the solution was about the same as that of commercial cranberry juice or dark red rose wine. As can be seen from Table 1, as the pH was raised from about 2.0 to about 6.0 and the boiling time increased, the extraction efficiency decreased. Surprisingly, regardless of pH, the same ruby red color was produced. More surprising was the observation that after 12 hours of direct sunlight per day for 30 days no color loss was visually discerned for any of the preparations. For treatments at pH 2.0, 3.0 and 4.0, no color loss was discernable after 180 days of 12 hours per day of direct sunlight. Commercial preparations of anthocyanin extract from grape skin extract and red cabbage extract turned yellow under the same conditions.

Example 2

Extraction of Anthocyanin Utilizing Various Carboxylic Acids

The procedures of Example 1 were repeated substituting other carboxylic acids (such as acetic acid and tartaric acid) as acidifying agents. Similar results were obtained. The procedures of Example 1 were repeated using all combinations of acidifying agent and hull types as described herein and similar results were obtained.

Example 3

Use of Stable Red Colorant in Food Products, Pharmaceuticals, Cosmetics and for Coloring Grain, Textiles, Paper and Leather.

10 grams of purple sunflower hulls with an anthocyanin content of 1.8% were treated with 1000 ml of boiling acidified water (citric acid, pH 3) for 90 seconds with constant stirring. The mixture was then allowed to cool to 26° C. and the hulls were removed. The resultant anthocyanin composition was concentrated by evaporation at temperatures not exceeding 70° C. to obtain 10 ml of a richly dyed anthocyanin concentrate that was ruby red in color with an anthocyanin concentration of 1.8%. This concentrate was added to clear sugar soda (carbonated) water in sufficient amounts to simulate the color of strawberry, raspberry, cherry, grape soda drinks. The darker colored sodas (grape) required more concentrate than the lighter colored sodas (raspberry). Sufficient amounts of concentrate were added to clear white wines to create pink blush, rose, red rose, and burgundy shades of wine. To create the darker shades it was only necessary to add more concentrate. All the above colored beverages showed no loss of color when exposed to 12 hours of direct sunlight per day for 30 days.

The concentrate was further concentrated by evaporation at temperatures below 70° C. to yield a dry powder, which, when added to the beverages described above, yielded the same stable colored beverages. The liquid and powder concentrate also yielded purple to red to pink colored fruit gels, yogurts, ice creams, and apple sauces.

The ruby red colorant of the present invention may be used in conjunction with other foods and with pharmaceuticals, cosmetics and other materials. For example, the colorant may be mixed with a granulation including an active drug prior to compression into a tablet, or included in a coating composition which is applied to a tablet. Likewise, the colorant of the present invention may be used to color pharmaceutical capsules, liquids, suspensions or gels. It may also be used to provide red color to a wide variety of cosmetics. The colorant of the present invention may also be used to color other biological materials such as a marker for pesticide or fungicide treatments on seed to indicate when the seed has been treated with chemicals. It may also be used to color textiles, paper and leather.

I claim:

1. A process for producing a stable colorant extract comprising:

a) contacting purple sunflower hulls with an aqueous acid solution comprising one or more carboxylic acids to produce an aqueous extract wherein the temperature of said aqueous acid solution is from about 55° C. to about 100° C.; and b) separating the aqueous extract of a) from the solid sunflower hull residue.

2. The process of claim 1, further comprising evaporative concentration of the aqueous extract.

3. The process of claim 1, wherein the temperature of said aqueous acid solution is about 100° C.

4. The process of claim 1, wherein the pH of said aqueous acid solution is from about pH 2.0 to about pH 6.0.

5. The process of claim 1, wherein the pH of said aqueous acid solution is about pH 2.5.

6. The process of claim 1, wherein said hulls are contacted with the aqueous acid solution for from about 5 seconds to about 40 minutes.

7. The process of claim 1, wherein said hulls have an anthocyanin percentage dry weight of at least 0.75%.

8. The process of claim 7, wherein said hulls are contacted with the aqueous acid solution for about 90 seconds.

* * * * *